US012619919B2

(12) United States Patent
Singla

(10) Patent No.: US 12,619,919 B2
(45) Date of Patent: May 5, 2026

(54) SYSTEMS AND METHODS FOR NODE WEIGHTING AND AGGREGATION FOR FEDERATED LEARNING TECHNIQUES

(71) Applicant: Verizon Patent and Licensing Inc., Basking Ridge, NJ (US)

(72) Inventor: Kushal Singla, Bangalore (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 990 days.

(21) Appl. No.: 17/546,132

(22) Filed: Dec. 9, 2021

(65) Prior Publication Data

US 2023/0186167 A1     Jun. 15, 2023

(51) Int. Cl.
*G06N 3/088*     (2023.01)
*G06N 3/09*     (2023.01)
*G06N 3/098*     (2023.01)
*G06N 20/20*     (2019.01)

(52) U.S. Cl.
CPC .................................... *G06N 20/20* (2019.01)

(58) Field of Classification Search
CPC ........ G06N 20/20; G06N 3/088; G06N 3/098; G06N 3/09
See application file for complete search history.

(56) References Cited

U.S. PATENT DOCUMENTS

| | | | | |
|---|---|---|---|---|
| 12,124,963 | B2 * | 10/2024 | Sun | .......................... G06N 3/098 |
| 12,302,451 | B2 * | 5/2025 | Siddam | .................. H04W 8/005 |

| | | | | |
|---|---|---|---|---|
| 2017/0279829 | A1 * | 9/2017 | Vasseur | ............... H04L 63/1458 |
| 2019/0227980 | A1 * | 7/2019 | McMahan | .............. G06N 3/044 |
| 2021/0051169 | A1 * | 2/2021 | Karame | ................. G06N 3/098 |
| 2021/0234687 | A1 * | 7/2021 | Zhou | ....................... G06Q 10/10 |
| 2021/0248215 | A1 * | 8/2021 | Prabhu | ..................... G06N 3/08 |

(Continued)

FOREIGN PATENT DOCUMENTS

| | | | | |
|---|---|---|---|---|
| WO | WO-2021008675 A1 * | 1/2021 | .......... | G06F 9/5061 |
| WO | WO-2023102754 A1 * | 6/2023 | | |

OTHER PUBLICATIONS

Ghosh et al. (An Efficient Framework for Clustered Federated Learning, published Jun. 8, 2021) (Year: 2021).*

(Continued)

*Primary Examiner* — Jennifer N Welch
*Assistant Examiner* — Jake Timothy Breen

(57)     ABSTRACT

A system described herein may provide a technique for enhanced federated learning in an environment that makes use of one or more centralized models. Different nodes may be associated with different groups. Each node may provide refinement information for a given centralized model. The modifications for particular groups may be aggregated and the model may be modified based on modifications associated with each group, as opposed to modifications associated with each node. Weights for each group may be determined based on attributes of the modifications associated with each group, which may allow for the identification, on a group basis, of bias, maliciously injected data, outliers, and/or other types of modifications which may reduce the quality of the model. As such, embodiments described herein may enhance the quality, accuracy, and predictive ability of federated learning techniques that utilize distributed or federated modifications to a centralized model.

20 Claims, 9 Drawing Sheets

700

702 Receive respective model refinement information, for particular model, from multiple nodes 704 Aggregate model refinement information on node group basis 706 Determine weights for each node group 708 Modify model based on aggregated refinement information and node group weights 710 Distribute modified model

(56) References Cited

U.S. PATENT DOCUMENTS

2023/0102888 A1 *  3/2023  Channapragada  ...... H04L 69/40
                                                        709/224
2024/0396811 A1 *  11/2024  Duan  .................. H04L 41/0806

OTHER PUBLICATIONS

Bonawitz et al. (Practical Secure Aggregation for Federated Learning on User-Held Data, published Nov. 14, 2016) (Year: 2016).*
Briggs et al. "Federated learning with hierarchical clustering of local updates to improve training on non-IID data", 2020 International Joint Conference on Neural Networks (IJCNN), Glasgow, UK, 2020, pp. 1-9, doi: 10.1109/IJCNN48605.2020.9207469. (Year: 2020).*
Gu et al. ("Detecting Malicious Model Updates from Federated Learning on Conditional Variational Autoencoder," 2021 IEEE International Parallel and Distributed Processing Symposium (IPDPS), 2021, pp. 671-680, doi: 10.1109/IPDPS49936.2021.00075) (Year: 2021).*
Li et al. ("Learning to Detect Malicious Clients for Robust Federated Learning", published Feb. 1, 2020, arXiv:2002.00211) (Year: 2020).*

* cited by examiner

Figure 2:
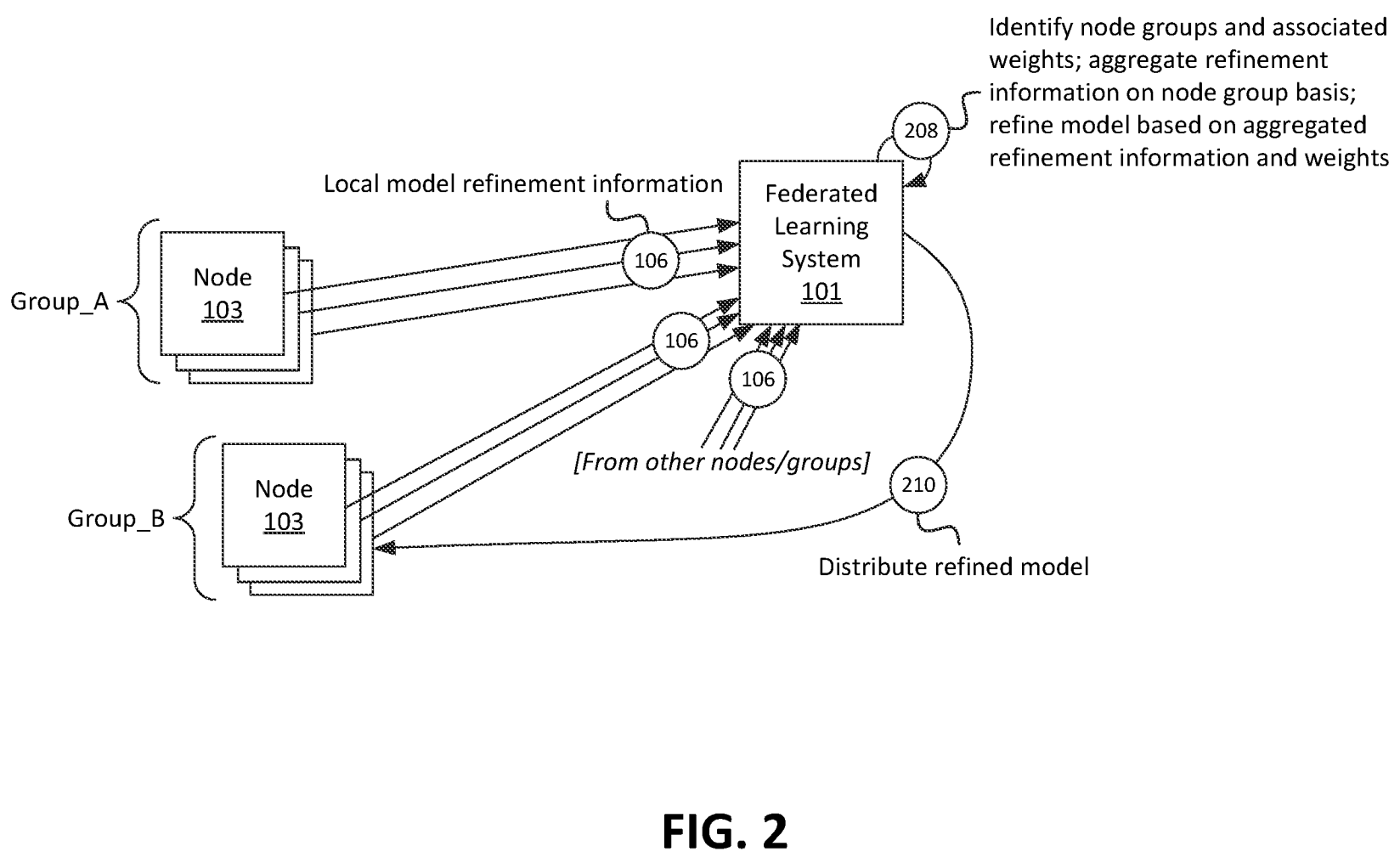

Identify node groups and associated weights; aggregate refinement information on node group basis; refine model based on aggregated refinement information and weights

208

Federated Learning System 101

210

Distribute refined model

Local model refinement information

106

106

106

[From other nodes/groups]

Node 103

Group_A

Node 103

Group_B

702 Receive respective model refinement information, for particular model, from multiple nodes 704 Aggregate model refinement information on node group basis 706 Determine weights for each node group 708 Modify model based on aggregated refinement information and node group weights 710 Distribute modified model

1000

SYSTEMS AND METHODS FOR NODE WEIGHTING AND AGGREGATION FOR FEDERATED LEARNING TECHNIQUES

BACKGROUND

Systems may utilize models, such as machine learning models, to aid in the performance of various functions such as pattern recognition, analysis of real-world data, automated network remediation, etc. Some systems may distribute a centralized model to several nodes, such as Internet of Things ("IoT") devices, and the individual nodes may modify the centralized model based on locally collected data, individualized processing at each node, etc.

BRIEF DESCRIPTION OF THE DRAWINGS

FIGS. 1-3 illustrate an example overview of one or more embodiments described herein;

DETAILED DESCRIPTION OF EXAMPLE EMBODIMENTS

The following detailed description refers to the accompanying drawings. The same reference numbers in different drawings may identify the same or similar elements.

Embodiments described herein provide one or more techniques for enhanced federated learning in an environment that makes use of one or more centralized models that may be modified based on feedback, training data, sensor data, gradients, etc. associated with one or more nodes to which such centralized models are distributed. In some embodiments, different nodes may be associated with different groups, categories, classes, types, etc. (referred to herein as "groups" for the sake of brevity). For example, different groups of nodes may be located in different geographical regions, may be owned and/or operated by different entities, may be configured with different sets of parameters, may include different types of sensors, and/or may have other differentiated attributes. As discussed herein, nodes of different groups may provide different modifications to a centralized model distributed to the different groups. The modifications for particular groups may be aggregated and the model may be modified based on modifications associated with each group (e.g., as opposed to modifications associated with each node). As further discussed herein, weights for each group may be determined based on attributes of the modifications associated with each group, which may allow for the identification, on a group basis, of bias, maliciously injected data, outliers, and/or other types of modifications which may reduce the quality of the model. As such, embodiments described herein may enhance the quality, accuracy, and predictive ability of federated learning techniques that utilize distributed or federated modifications to a centralized model.

Figure 1:
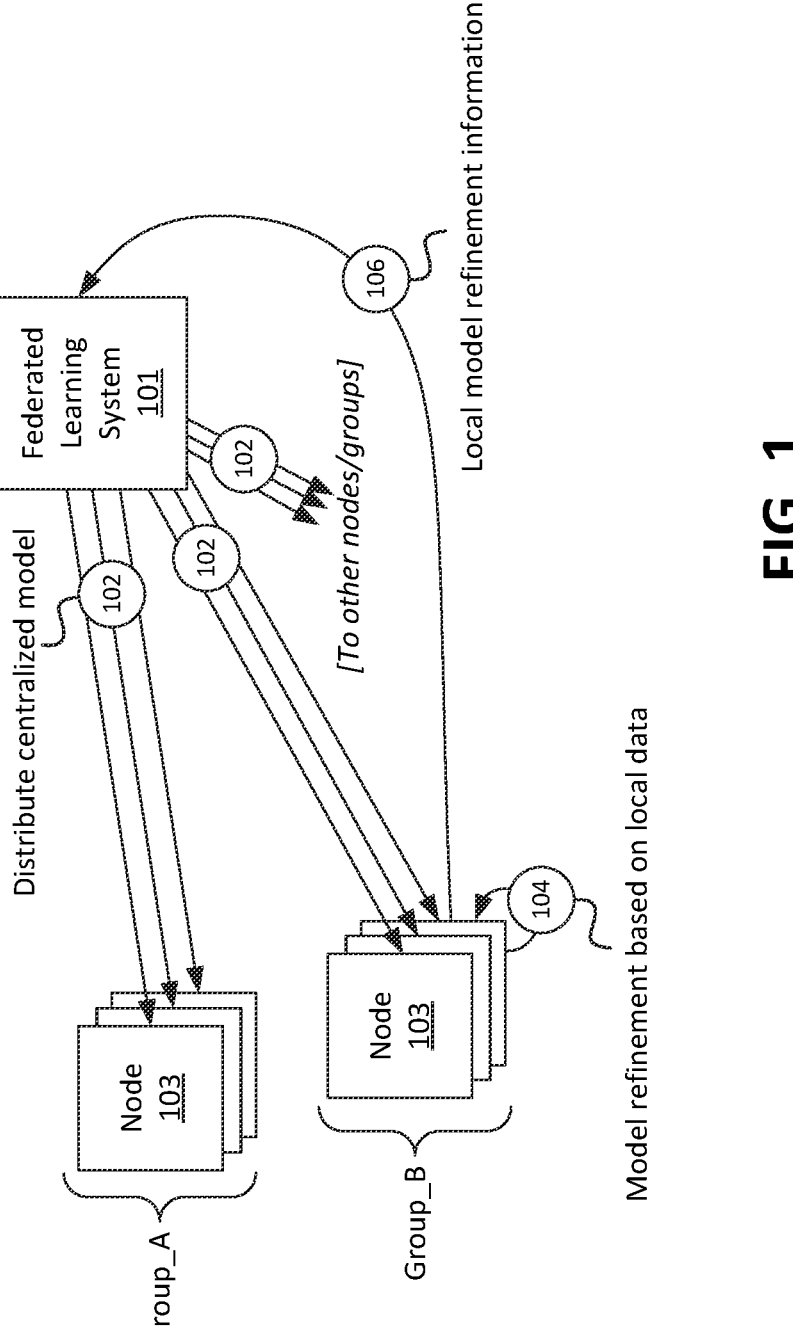

As shown in FIG. 1, for example, Federated Learning System ("FLS") 101 may distribute (at 102) a centralized model to multiple nodes 103. In some embodiments, nodes 103 may include Internet of Things ("IoT") devices, Machine-to-Machine ("M2M") devices, User Equipment ("UEs"), and/or other types of suitable devices. The centralized model may include a predictive model, a statistical model, a machine learning model, and/or some other suitable type of model. The model may be used to, for example, categorize or classify a set of input data, such as sensor data detected, collected, received, etc. by nodes 103. In some embodiments, the model may include one or more features, feature importance weights, labels, correlations between features, correlations between labels, correlations between features and labels, and/or other suitable information.

As further shown in FIG. 1, nodes 103 may be associated with multiple groups, shown as "Group_A," "Group_B," and/or other groups. As noted above, a particular group may be associated with a particular geographical region (e.g., a particular geographical region in which respective nodes 103 are located or otherwise associated), a particular owner and/or operator entity associated with respective nodes 103, type(s) of sensors or other devices integrated in or otherwise associated with nodes 103 (e.g., accelerometers, gyroscopes, Global Positioning System ("GPS") sensors, barometers, photosensors, Light Detection and Ranging ("LIDAR") sensors, etc.), and/or other identifiable attributes of nodes 103. In some embodiments, a particular group of nodes 103 may be associated with a particular device type, such as a particular make and/or model of device, a particular category of device (e.g., IoT device, M2M device, mobile phone, etc.).

The centralized model may have been generated, trained, modified, refined, etc. by FLS 101 or some other suitable device or system that is communicatively coupled to FLS 101. Nodes 103 may utilize the centralized model to, as similarly discussed above, classify or categorize sensor data received by nodes 103, perform one or more remedial actions, and/or otherwise utilize the centralized model. Nodes 103 may further refine (at 104) the centralized model based on local data. For example, nodes 103 may perform supervised and/or unsupervised artificial intelligence/machine learning ("AI/ML") techniques such as K-means clustering, neural networks, deep learning, user-provided feedback, classification, and/or other suitable techniques in order to refine, train, modify, etc. the received centralized model.

While operation 104 is shown in FIG. 1 as being performed by a single node 103 for the sake of clarity, in practice, some or all of the nodes 103 may refine the centralized model based on local data associated with each node 103. In this manner, each node 103 may retain a different version of the centralized model based on different refinements, modifications, etc. performed by each respective node 103.

As further shown in FIGS. 1 and 2, each node 103 may provide (at 106) local model refinement information to FLS 101. The local refinement information associated with a given node 103 may include adjustments, modifications, etc. to particular aspects of the centralized model, such as modifying feature importance weights of particular features, modifying affinities and/or correlations between features and/or labels, adding additional features or removing features from the model, and/or other suitable modifications. As noted above, each set of local refinement information provided (at 106) by each node 103 may be different, such that a relatively large amount of local refinement information may be provided to FLS 101 over time.

In order to reduce the processing resources or other resources that would be consumed in refining the centralized model based on each set of local refinement information associated with each node 103, FLS 101 may identify (at 208) node groups associated with nodes 103 from which local refinement information was received (at 106), may aggregate the refinement information on a node group basis, and may refine the model based on the aggregated refinement information. For example, assume that Group_A includes 1,000 nodes 103 and that Group_B includes 10,000 nodes 103. In accordance with embodiments herein, instead of refining the centralized model based on 11,000 sets of local refinement information (e.g., associated with each node 103), FLS 101 may refine the centralized model based on two sets of aggregated local refinement information (e.g., one set of aggregated local refinement information for each node group). In this manner, the refinement of the model may be less complex and resource-intensive than refining the model based on individual sets of local refinement information.

As further discussed herein, FLS 101 may determine different weights for different node groups. For example, a particular node group may provide local refinement information that deviates significantly from local refinement information provided by other node groups, and/or is biased with respect to one or more labels (e.g., exhibits a relatively large amount of error with respect to such labels). In accordance with embodiments described herein, the weights associated with such node groups may be adjusted (e.g., reduced with respect to other node groups, set to zero, etc.) such that the impact to the model, based on local refinement information associated with these node groups, may be reduced or eliminated. That is, the adjustment of the weights associated with nodes that exhibit relatively substantial bias with respect to one or more labels and/or that are otherwise outliers with respect to other nodes may improve the quality of the model.

In some embodiments, FLS 101 may include and/or may be implemented by a single device or system, such as a cloud computing system, a Multi-Access/Mobile Edge Computing ("MEC") device, referred to sometimes herein simply as a "MEC," a server, etc. In some embodiments, some or all of the functionality described herein with respect to FLS 101 may be performed by multiple devices or systems. For instance, in FIG. 3, some functionality that may be performed by FLS 101 is described as being performed by aggregator 301 and modeling system 303. For example, in some embodiments, aggregator 301 and modeling system 303 may communicate via one or more networks, such as the Internet, one or more wireless networks, etc. In some embodiments, aggregator 301 and modeling system 303 may be implemented by the same device or system, and may communicate via a device bus or other suitable type of communication pathway. In some embodiments, multiple aggregators 301 may perform some or all of the operations described herein. For example, a particular aggregator 301 may be, may include, may be implemented by, and/or may be communicatively coupled to a hub, such as a "smart home" hub, or other type of device with which multiple nodes 103 (e.g., IoT devices, such as "smart home" devices) communicate.

Figure 3:
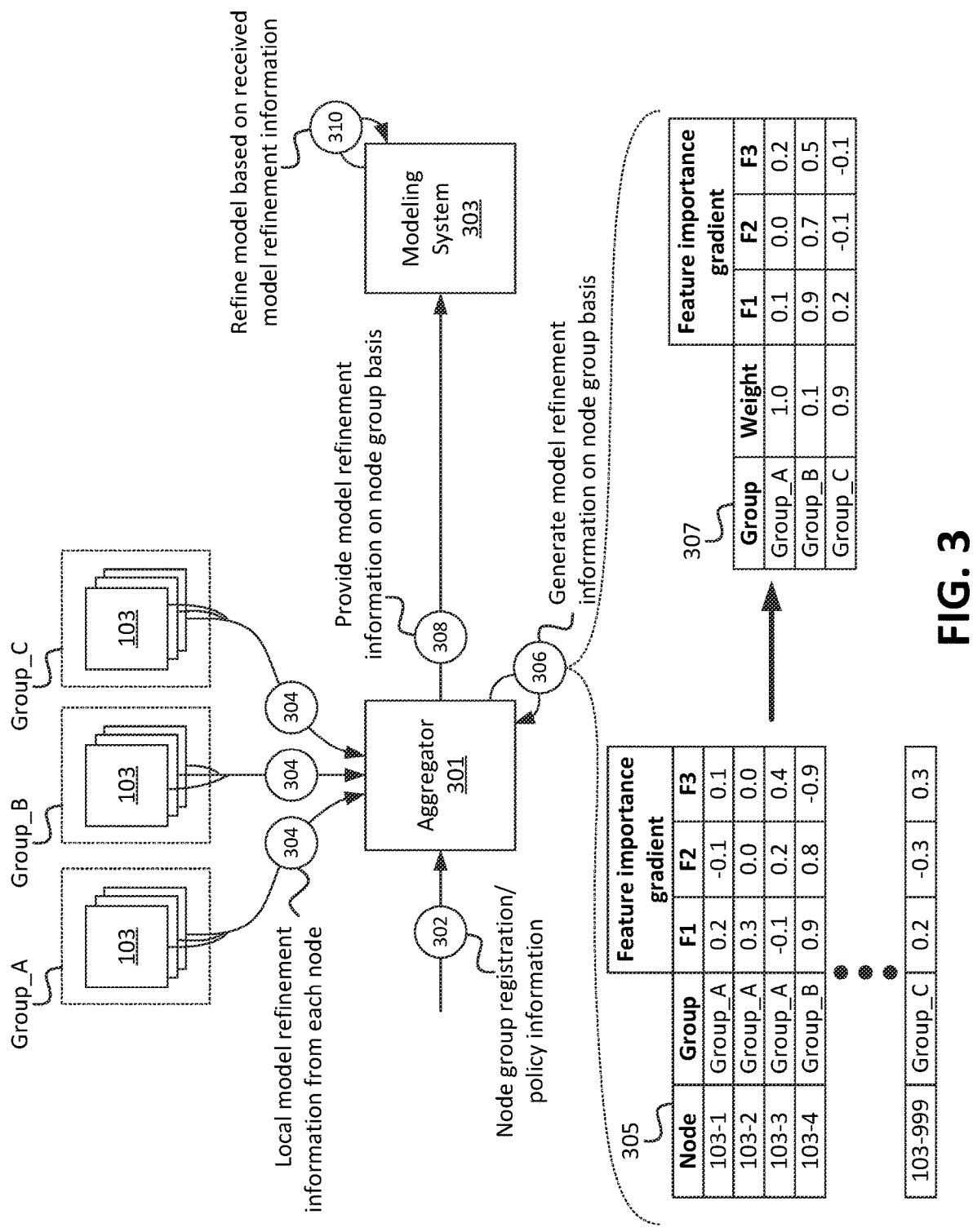

As shown in FIG. 3, aggregator 301 may receive (at 302) node group registration and/or policy information, indicating particular node groups and/or attributes of nodes 103 that are associated with particular node groups. For example, aggregator 301 may receive such information via a web portal, an application programming interface ("API"), or some other suitable communication pathway. In some embodiments, the node group registration and/or policy information may be manually specified by an operator, administrator, and/or other suitable entity. In some embodiments, the node group registration and/or policy information may be generated or modified automatically, such as via one or more AI/ML techniques or other suitable automated techniques.

The node group registration and/or policy information may specify identifiers of nodes 103, such as a Mobile Directory Number ("MDN"), an International Mobile Subscriber Identity ("IMSI") value, an International Mobile Station Equipment Identity ("IMEI") value, a Subscription Permanent Identifier ("SUPI"), a Globally Unique Temporary Identifier ("GUTI"), an Internet Protocol ("IP") address, and/or other one or more other suitable identifiers based on which a particular node 103 may be uniquely identified. In some embodiments, the node group registration and/or policy information may specify one or more conditions, criteria, policies, etc. based on which one or more nodes 103 may be respectively associated with one or more node groups. For example, the node group registration and/or policy information may specify that nodes 103 that are associated with a particular make and/or model of device, that include a particular type of sensor (e.g., accelerometer, gyroscope, barometer, LIDAR sensor, etc.), that have particular attributes (e.g., screen size, processor clock speed, memory capacity, battery capacity, etc.), that exhibit particular performance metrics (e.g., network traffic throughput, latency, etc.), and/or are associated with other identifiable attributes are associated with a particular node group.

In the examples provided herein, nodes 103 are described in the context of being associated with only one node group. In practice, a particular node 103 may be associated with multiple node groups. In some embodiments, aggregator 301 may identify or determine a node group associated with a particular node 103 without receiving (at 302) node group registration and/or policy information. For example, aggregator 301 may identify node groups based on attributes or characteristics of nodes 103 from which information is received (e.g., location, device type, sensor type, etc.), based on identifier information provided by nodes 103 (e.g., nodes 103 may explicitly provide node group identifiers or other identifiers), and/or in some other suitable manner.

As further shown, aggregator 301 may receive (at 304) local refinement information from each node 103. As noted above, the local refinement information may include refinements, modifications, etc. to a centralized model distributed to each node 103. For example, as also discussed above, a given node 103 may determine one or more modifications to the centralized model based on AI/ML techniques, model training techniques, locally measured sensor information, etc. A particular instance of local refinement information may be associated with a particular node 103, and may refer to refinement information received from the particular node 103 at a particular time, and/or to refinement information received from the particular node 103 over a particular time window.

In some embodiments, attributes or characteristics (e.g., trends, averages, means, peaks, curve shapes, and/or other attributes or characteristics) of local refinement information associated with a set of nodes 103 may be used to identify a respective node group to which each node 103 of the set of nodes 103 belongs. For example, nodes 103 exhibiting relatively similar local refinement information (e.g., at least a threshold measure of similarity as determined via a suitable similarity analysis technique) may be associated with the same node group. Generally, local refinement information for two given groups may be relatively similar when some or all values of local refinement information for the two groups are within a threshold of each other. In some embodiments, one or more scores, averages, means, or other derived values may be determined for each set of local refinement information associated with two groups, and a measure of similarity between the two groups may be determined based on a measure of similarity of the scores, averages, means, etc. associated with the two groups.

In the examples described herein, the local refinement information may include one or more feature importance gradients, which may indicate modifications to feature importance weightings for one or more features associated with the centralized model. For example, a given node 103 may determine that a particular feature associated with the centralized model has a lower feature importance than indicated by the model (e.g., a presence or value associated with the feature may have a lower impact to an output of the model than initially indicated by the model), in which case the local model refinement information for the given node 103 may indicate a low (e.g., negative or below a threshold) feature importance gradient for the particular feature. On the other hand, node 103 may determine that a particular feature associated with the centralized model has a higher feature importance than indicated by the model, in which case the local model refinement information for the given node 103 may indicate a positive feature importance gradient for the particular feature. In some embodiments, such gradients may be indicated differently (e.g., a positive gradient may indicate a lower feature importance, etc.), and/or the local model refinement information may indicate other types of modifications to the centralized model.

Thus, in situations where local model refinement information is received (at 304) from a relatively large quantity of nodes 103, the quantity of modifications to the centralized model may accordingly be relatively high, absent the techniques described herein. For example, data structure 305 may represent the local model refinement information received from 999 nodes 103 (e.g., nodes 103-1 through 103-999). For example, data structure 305 may include 999 instances of refinement information, records, rows, etc.

In this example, each node 103 may be associated with a particular node group of a set of node groups (e.g., Group_A, Group_B, or Group_C). As noted above, aggregator 301 may identify a particular node group associated with a given node 103 based on node group registration and/or policy information, a node group identifier (or other type of identifier) provided by nodes 103, and/or in some other suitable manner.

Data structure 305 may include feature importance gradient information, for each node 103, for three example features F1, F2, and F3. In practice, additional or fewer features may be indicated, and/or the local model refinement information for each node 103 may be some other type of model refinement information. For example, data structure 305 may indicate that node 103-1 determined that the feature F1 has a higher measure of feature importance than indicated in the centralized model (e.g., where the value of "0.2" indicates the degree of how much higher the locally determined importance of feature F1 is as compared to the centralized model), and that feature F2 has a lower measure of feature importance than indicated in the centralized model. Data structure may also indicate that node 103-1 determined that feature F3 was more important than indicated in the centralized model. In this example, the degree of variation between the importance of feature F3 as indicated in the centralized model and the importance of feature F3 as locally determined by node 103-1 (e.g., 0.1) may be lower than the degree of variation between the importance of feature F1 as indicated in the centralized model and the importance of feature F1 as locally determined by node 103-1 (e.g., 0.2).

Aggregator 301 may generate (at 306) model refinement information on a node group basis, thus reducing the quantity of modifications to be made to the centralized model. For example, aggregator 301 may identify a node group associated with a given node 103 from which local refinement information was received, and aggregate, compute an average or mean, and/or otherwise combine the local refinement information from multiple nodes 103 of the same node group to generate model refinement information on a node group basis. Data structure 307 may include aggregated (e.g., on a group basis) feature importance information based on the local model refinement information received (at 304) from nodes 103. Instead of 999 records for 999 nodes (e.g., as included in data structure 305), data structure 307 may include three records for the same 999 nodes (e.g., the three node groups to which the 999 nodes belong). For example, the record for Group_A may be based on average, mean, and/or other combined or derived values based on the records for nodes 103 belonging to Group_A. The example feature importance gradient value of 0.1 for feature F1, in the Group_A record of data structure 307, may be based on feature importance gradient values, associated with respective nodes 103, for feature F1 as indicated in data structure 305. The example feature importance gradient value of 0.0 for feature F2, in the Group_A record of data structure 307, may be based on feature importance gradient values, associated with respective nodes 103, for feature F2 as indicated in data structure 305. Further, the example feature importance gradient value of 0.2 for feature F3, in the Group_A record of data structure 307, may be based on feature importance gradient values, associated with respective nodes 103, for feature F3 as indicated in data structure 305.

Aggregator 301 may also determine a weight for each node group, as shown in data structure 307. Examples of weight determination for a given node group are described below. Aggregator 301 may provide (at 308) the model refinement information on a node group basis (e.g., some or all of data structure 307, and/or some other suitable type of information) to modeling system 303. Modeling system 303 may refine (at 310) the centralized model based on the received model refinement information. For example, modeling system 303 may utilize data structure 307 as training data, feedback, and/or some other suitable type of information based on which the model may be refined. In some embodiments, node groups having a greater weight may have a relatively greater impact to modifications made to the model, while node groups having a lower weight may have a relatively lower impact to modifications made to the model. Node groups having a zero weight may have no impact to modifications made to the model. For example, such node groups may be identified as being associated with an attack vector or some other type of anomaly based on which the local refinement information from such node groups may be discarded, quarantined, etc. Once the centralized model has been modified (at 310), aggregator 301 and/or some other device or system may distributed the modified centralized model to some or all of nodes 103, which may continue to utilize the model and provide (at 304) local model refinement information. In this sense, some or all of the operations shown in FIG. 3 may be repeated iteratively and/or in an ongoing process, to continue to refine the model.

Figure 4:
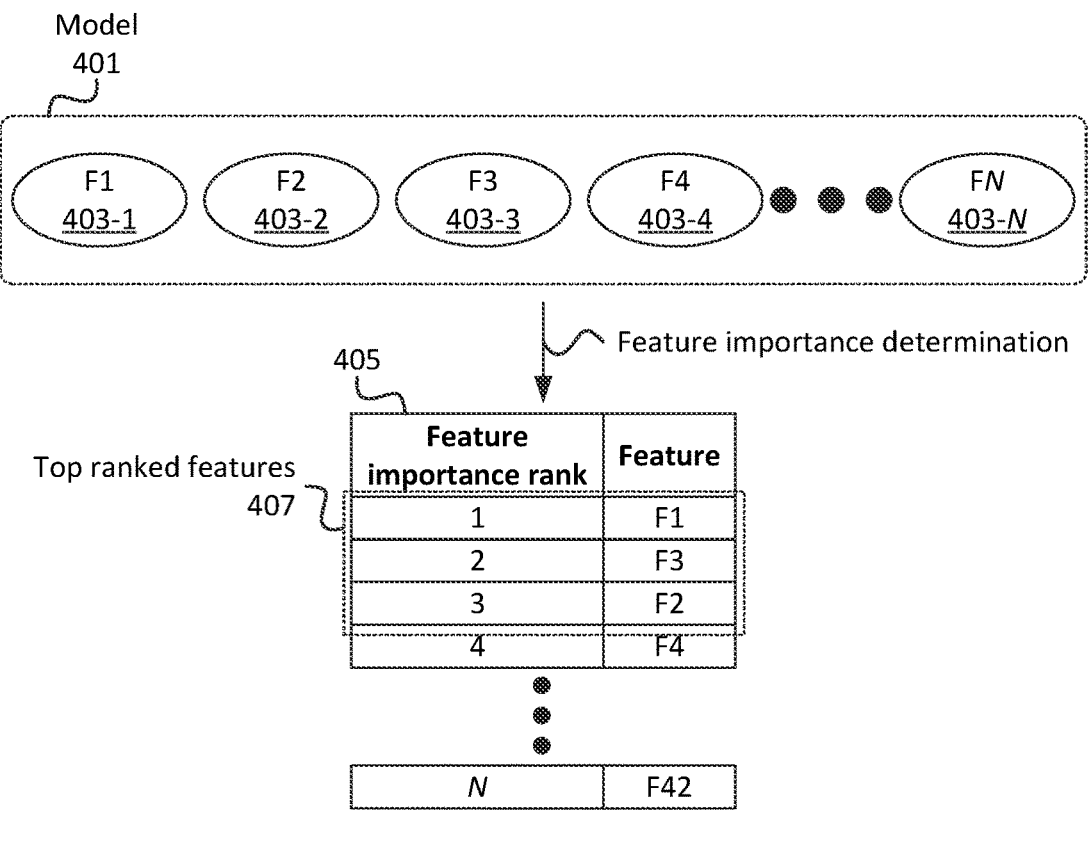
FIGS. 4 and 5 illustrate an example weighting of node groups based on the detection of outliers and/or anomalous model refinement information associated with such node groups, in accordance with some embodiments.

As noted above, some or all of the node groups may be associated with a particular weight. In some embodiments, the weights may be determined based on one or more other factors, such as device type, location, an identity of an owner or operator of particular nodes 103, etc. As described in FIGS. 4-6, the weights may be determined based on attributes of the local refinement information received from nodes 103 of the node groups. For example, as shown in FIG. 4, a particular model 401 may be associated with a set of features 403 (e.g., features F1, F2, F3, etc.). FLS 101, aggregator 301, modeling system 303, and/or some other device or system may rank the set of features 403 based on a measure of feature importance, using any suitable technique for determining feature importance. In this example, data structure 405 indicates the relative feature importance ranking of the set of features 403. For example, feature F1 may be identified as the most important feature, feature F3 may be identified as the second-most important feature, feature F2 may be identified as the third-most important feature, feature F4 may be identified as the fourth-most important feature, and so on. In some embodiments, a set 407 of top ranked features may be identified, such as the three highest ranked features, features that are associated with at least a threshold measure of importance, etc. Here, the set 407 of top ranked features associated with model 401 includes features F1, F2, and F3.

Figure 5:
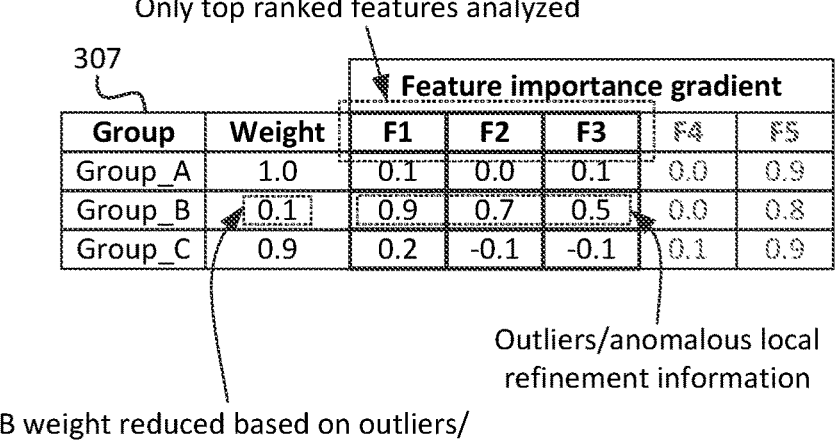

As shown in FIG. 5, data structure 307 (e.g., indicating feature importance gradients on a group basis) may be analyzed for outliers or other anomalous values. For example, the set 407 of top ranked features may be analyzed with respect to each node group. In some embodiments, additional features may be analyzed, and/or all features may be analyzed. As shown, Group_B is determined as being associated with outliers and/or anomalous local refinement information for the set 407 of top ranked features. For example, the value of 0.9 for feature F1, associated with Group_B, may vary from the values of 0.1 and 0.2 for feature F1, associated with Group_A and Group_C, respectively. In some embodiments, for example, an average, mean, etc. of the gradients for the other groups (e.g., Group_A and Group_C) may be compared to the gradients for a particular group (e.g., Group_B) to identify whether the particular group exhibits outliers, anomalous information, etc. In some embodiments, some other suitable analysis may be performed to identify node groups that exhibit outliers, anomalous information, etc.

In this example, Group_B may be identified as exhibiting relatively anomalous local refinement information, which may cause the weight of Group_B be to be set or adjusted (e.g., reduced) to a relatively low value (e.g., 0.1 on a scale of 0 to 1). For example, Group_B may have a higher measure of variation, for one or more features, as compared to Group_A and/or Group_C. On the other hand, Group_A may be identified as exhibiting a relatively low (e.g., below a threshold, and/or lower than other node groups) measure of variation of local refinement information, which may cause the weight of Group_A to be set or adjusted (e.g., increased) to a relatively high or maximum value (e.g., 1.0 on a scale of 0 to 1). Further, Group_C may also be identified as exhibiting a relatively low (e.g., below a threshold, and/or lower than other node groups) measure of anomalous local refinement information, but a higher measure of anomalous local refinement information than Group_A. As such, the weight of Group_C to be set or adjusted (e.g., increased) to a relatively high value that is lower than the weight of Group_A (e.g., 0.9 on a scale of 0 to 1).

In some embodiments, one or more models may be generated, modified, trained, etc. based on local refinement information that has been identified as anomalous or non-anomalous. Such models may modified, trained, etc. to reflect that input data is anomalous, includes outliers, etc. when the input data matches (e.g., within a threshold measure of similarity) local refinement information that was previously identified as anomalous, as including outliers, etc. In some embodiments, such models may modified, trained, etc. to reflect that input data is not anomalous, does not include outliers, etc. when the input data matches (e.g., within a threshold measure of similarity) local refinement information that was previously identified as not anomalous, as not including outliers, etc. In some embodiments, such models may modified, trained, etc. to reflect that input data is not anomalous, does not include outliers, etc. when the input data does not match local refinement information that was previously identified as anomalous, as including outliers, etc.

As another example of group weighting, FLS 101 may evaluate local refinement information associated with each node group with respect to one or more labels, categories, classifiers, and/or other output values (referred to herein simply as "labels" for the sake of brevity) in order to determine whether a given model 401 is biased with respect to such labels. "Bias" with respect to a given label, as described herein, may refer to a disproportionate level of error with respect to the label exhibited by one or more group as compared to one or more other groups (e.g., as compared to a mean, average, or other suitable measure of error associated with the one or more other groups). For example, a group that exhibits a relatively large measure of error with respect to a particular label, while other groups exhibit a relatively lower measure of error with respect to the particular label, may be biased with respect to the particular label.

Figure 6:
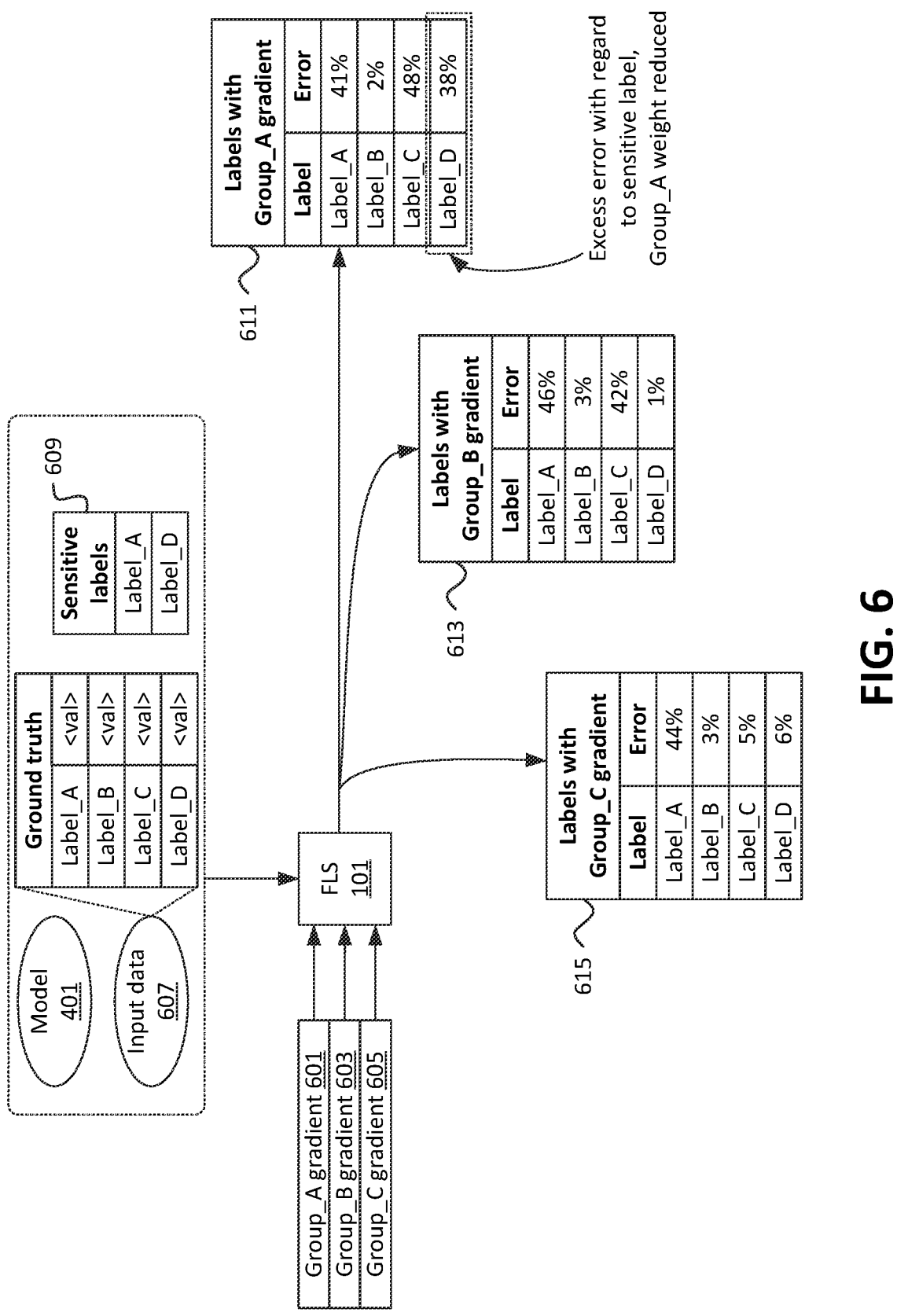
FIG. 6 illustrates an example weighting of node groups based on the detection of bias or error with respect to one or more sensitive labels, in accordance with some embodiments.

As shown in FIG. 6, for example, FLS 101 (e.g., aggregator 301 and/or some other device or system) may receive local refinement information for a particular model 401 from nodes 103 associated with three example groups (e.g., Group_A, Group_B, and Group_C), which may include gradients 601, 603, and 605. FLS 101 may evaluate gradients 601, 603, and 605 using a particular set of input data 607 and a set of sensitive labels 609. Sensitive labels 609 may include classifications relating to particular demographics information (e.g., race, gender, nationality, etc.), secure information (e.g., financial information, passwords, etc.), and/or other sensitive information. Input data 607 may include and/or may be associated with "ground truth" information for which the presence, absence, values, etc. of particular labels (e.g., Label_A, Label_B, Label_C, and Label_D) has been previously determined and/or is otherwise known. The "ground truth" information may refer to known or expected outputs associated with input data 607, and may be used in a test or validation technique to analyze the results of a given model that generates outputs based on input data 607.

FLS 101 may, in some embodiments, utilize a version of model 401, modified with the respective gradients for each node group, in order to generate three sets of outputs. That is, each set of outputs may be based on input data 607 and a respective gradient 601, 603, or 605. FLS 101 may compare these outputs to the "ground truth" information associated with input data 607 to identify a measure of error associated with each gradient (e.g., associated with each node group). Data structures 611, 613, and 615 may each indicate a measure of error for each label generated by a different variation of model 401 based on input data 607. The different variations of model 401 may include variations associated with different node groups (e.g., gradients 601, 603, or 605). A measure of error associated with a given label, for a particular node group, may be based on a comparison of the output of a particular variation of model 401 when provided input data 607, to the "ground truth" information associated with input data 607.

For example, data structure 611 may indicate that a measure of error with respect to Label_A, when input data 607 is provided to model 401 modified with gradient 601, is 41%. This may indicate that Label_A is present 41% more frequently under model 401 modified with gradient 601 than Label_A is present in the "ground truth" information. As another example, the information in data structure 611 may indicate that Label_A is present 41% less frequently under model 401 modified with gradient 601 than Label_A is present in the "ground truth" information. In some embodiments, data structure 611 may indicate some other variation, quantified as "41%," between model 401 modified with gradient 601 as compared to the "ground truth" information.

In this example, FLS 101 may determine that gradient 601 (associated with Group_A) is associated with excess error with respect to a sensitive label. For example, FLS 101 may identify that Group_A exhibits a relatively large amount of error (i.e., 38% in this example) with respect to Label_D, which is included in the set of sensitive labels 609. For example, FLS 101 may determine that 38% is greater than a threshold measure of error. Additionally, or alternatively, FLS 101 may determine that Group_A exhibits more error (e.g., at least a threshold amount greater) with respect to Label_D than is exhibited than other groups (e.g., 38% for Group_A as opposed to 1% for Group_B or 6% for Group_C).

On the other hand, while data structure 611 indicates a relatively high amount of error with respect to Label_C for Group_A (e.g., 48%), FLS 101 may disregard this relatively high error for the purpose of bias detection, as Label_C is not included in the set of sensitive labels 609. Further, while Label_A, which is included in the set of sensitive labels 609, is associated with a relatively high measure of error (e.g., 41%), FLS 101 may determine that Group_A does not exhibit excessive error with respect to Label_A, as the other groups also exhibit relatively high error with respect to Label_A (e.g., 46% for Group_B and 44% for Group_C). That is, the measure of error for this label may be within a threshold level of variation as compared to other node groups, based on which excess error may not be identified for any of the node groups. In other embodiments, FLS 101 may determine that Group_A, Group_B, and Group_C are associated with excessive error with respect to Label_A based on the measures of error for each group exceeding a threshold measure of error.

In some embodiments, FLS 101 may determine, adjust, etc. a weight for each node group based on the determined amount of error with respect to one or more labels (e.g., sensitive labels 609) as described above. Additionally, or alternatively, FLS 101 may determine, adjust, etc. a weight for each node group based on outliers and/or anomalous values, as described above with respect to FIGS. 4 and 5. Additionally, or alternatively, FLS 101 may determine, adjust, etc. a weight for each node group based on one or more other factors.

Figure 7:
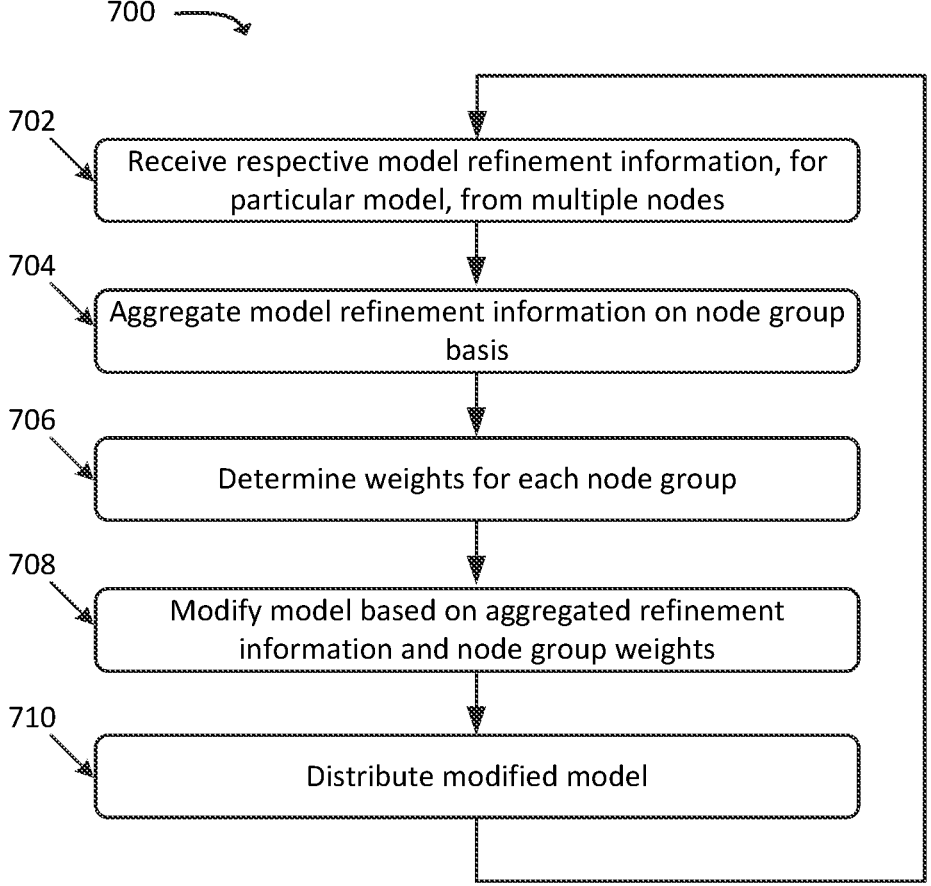
FIG. 7 illustrates an example process for refining a centralized model based on refinement information received from multiple nodes, in accordance with some embodiments.

FIG. 7 illustrates an example process 700 for refining a centralized model (e.g., model 401) based on refinement information received from multiple nodes 103. In some embodiments, some or all of process 700 may be performed by FLS 101. In some embodiments, one or more other devices may perform some or all of process 700 in concert with, and/or in lieu of, FLS 101 (e.g., aggregator 301, modeling system 303, and/or some other device or system).

As shown, process 700 may include receiving (at 702) respective model refinement information, for a particular model 401, from multiple nodes 103. For example, as discussed above, model 401 (e.g., a centralized model) may have been distributed to a set of nodes 103, which may each generate one or more instances of model refinement information. Such model refinement information may include feature importance gradients or other suitable modifications to model 401. Each instance of model refinement information (e.g., associated with a particular node 103) may be based on sensor readings, localized processing, etc. associated with each particular node 103. As such, each instance of model refinement information may include one or more different modifications to model 401.

Process 700 may further include aggregating (at 704) the model refinement on a node group basis. For example, as discussed above, FLS 101 may identify one or more respective node groups to which each node 103, associated with the received model refinement information, belongs. Such determination may be based on previously received node group registration information, metadata or header information (or other suitable information) received with the model refinement information, etc. Aggregating the model refinement information may include determining average values, determining mean values, and/or performing some other computation on model refinement information associated with nodes 103 of a given node group in order to generate model refinement information associated with the node group.

Process 700 may additionally include determining (at 706) respective weights for each node group. For example, as discussed above, FLS 101 may identify node groups that are associated with model refinement information that varies or differs from model refinement information associated with one or more other groups. For example, a node group for which one or more values associated with respective model refinement information are at least a threshold measure of variation from model refinement values associated with other node groups may be associated with a lower weight than one or more of the other node groups. As another example, a node group associated with a higher measure of error (e.g., at least a threshold measure higher) with respect to a particular label as compared to one or more other node groups may be associated with a lower weight. In some embodiments, different node groups may have different weights (e.g., on a "sliding scale") based on a measure or degree of variation, error, etc. as compared to other node groups. For example, a first node group exhibiting a relatively large measure of variation from other node groups may be associated with a relatively low (or zero) weight, while a second node group exhibiting a relatively small measure of variation from other node groups may be associated with a relatively high (or maximum) weight.

Process 700 may also include modifying (at 708) the centralized model (e.g., model 401) based on the aggregated refinement information and the node group weights. For example, FLS 101 may utilize the aggregated refinement information (e.g., on a per-node group basis) to train, refine, etc. model 401. In some embodiments, the training, refinement, etc. may be based on the weights for each group. For example, model refinement information associated with a node group with a relatively low weight may have a lower impact to the modification of model 401 than model refinement information associated with a node group with a relatively high weight.

Process 700 may further include distributing (at 710) the modified model. For example, once FLS 101 has modified (at 708) the centralized model, FLS 101 may distribute the centralized model to the same set of nodes 103 from which model the refinement information was received (at 702) and/or may distribute the centralized model to one or more other nodes 103 or other devices. Some or all of process 700 may repeat iteratively and/or on some other ongoing basis, such that the model may continue to be refined, reinforced, etc. based on new model refinement information generated by nodes 103 receiving the centralized model.

Figure 8:
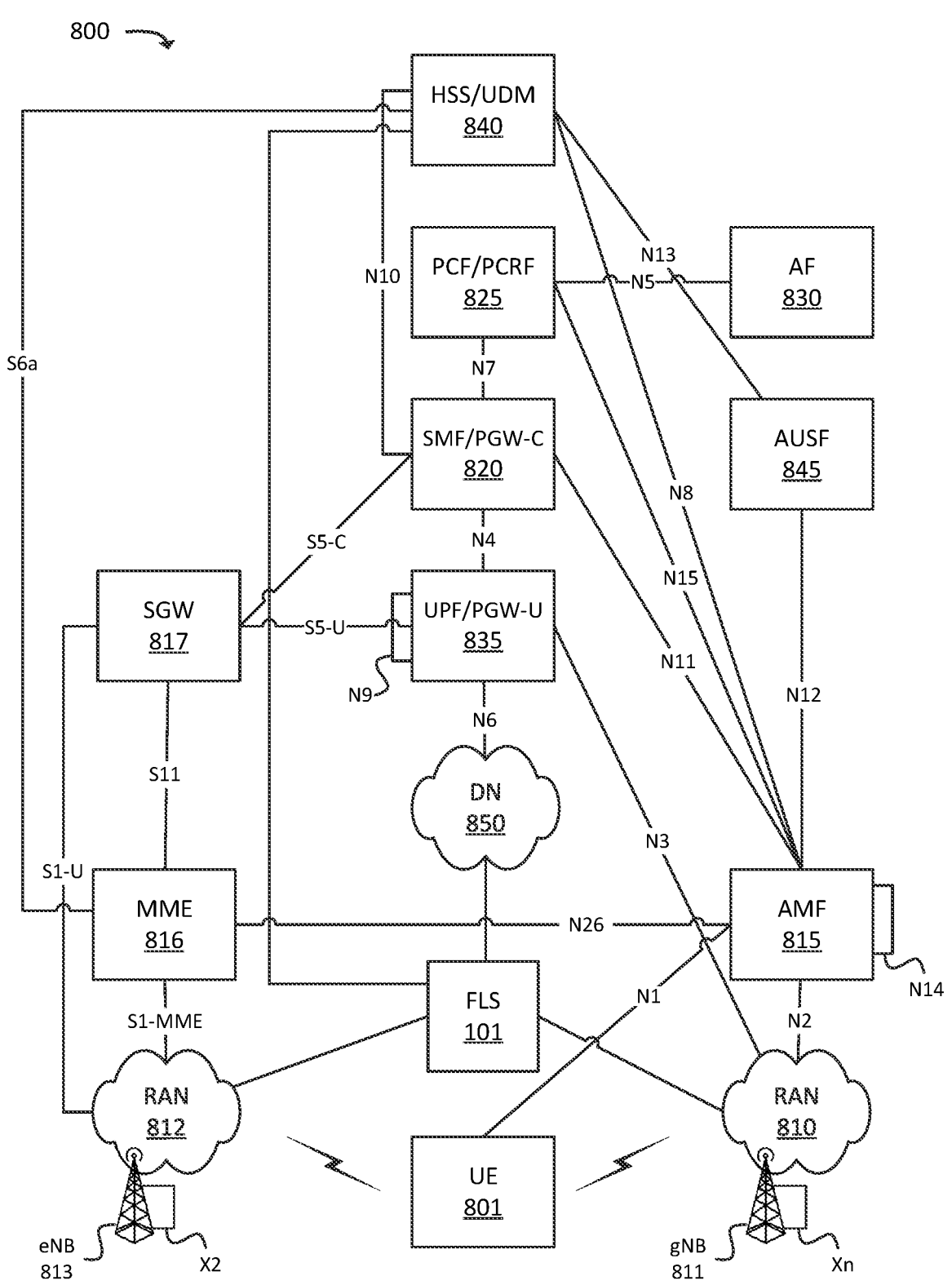
FIG. 8 illustrates an example environment in which one or more embodiments, described herein, may be implemented.

FIG. 8 illustrates an example environment 800, in which one or more embodiments may be implemented. In some embodiments, environment 800 may correspond to a Fifth Generation ("5G") network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 800 may include UE 801, RAN 810 (which may include one or more Next Generation Node Bs ("gNBs") 811), RAN 812 (which may include one or more evolved Node Bs ("eNBs") 813), and various network functions such as Access and Mobility Management Function ("AMF") 815, Mobility Management Entity ("MIME") 816, Serving Gateway ("SGW") 817, Session Management Function ("SMF")/Packet Data Network ("PDN") Gateway ("PGW")-Control plane function ("PGW-C") 820, Policy Control Function ("PCF")/Policy Charging and Rules Function ("PCRF") 825, Application Function ("AF") 830, User Plane Function ("UPF")/PGW-User plane function ("PGW-U") 835, Home Subscriber Server ("HSS")/Unified Data Management ("UDM") 840, and Authentication Server Function ("AUSF") 845. Environment 800 may also include one or more networks, such as Data Network ("DN") 850. Environment 800 may include one or more additional devices or systems communicatively coupled to one or more networks (e.g., DN 850), such as FLS 101, which may perform one or more functions described above. As noted above, FLS 101 may include, may implement, and/or may be communicatively coupled to one or more instances of aggregator 301, modeling system 303, and/or one or more other suitable devices or systems.

The example shown in FIG. 8 illustrates one instance of each network component or function (e.g., one instance of SMF/PGW-C 820, PCF/PCRF 825, UPF/PGW-U 835, HSS/UDM 840, and/or AUSF 845). In practice, environment 800 may include multiple instances of such components or functions. For example, in some embodiments, environment 800 may include multiple "slices" of a core network, where each slice includes a discrete set of network functions (e.g., one slice may include a first instance of SMF/PGW-C 820, PCF/PCRF 825, UPF/PGW-U 835, HSS/UDM 840, and/or AUSF 845, while another slice may include a second instance of SMF/PGW-C 820, PCF/PCRF 825, UPF/PGW-U 835, HSS/UDM 840, and/or AUSF 845). The different slices may provide differentiated levels of service, such as service in accordance with different Quality of Service ("QoS") parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. Alternatively, or additionally, one or more of the devices of environment 800 may perform one or more network functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800.

UE 801 may include a computation and communication device, such as a wireless mobile communication device that is capable of communicating with RAN 810, RAN 812, and/or DN 850. UE 801 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, an M2M device, or the like), or another type of mobile computation and communication device. UE 801 may send traffic to and/or receive traffic (e.g., user plane traffic) from DN 850 via RAN 810, RAN 812, and/or UPF/PGW-U 835. In some embodiments, each node 103 may include, may be implemented by, and/or may be communicatively coupled to one or more UEs 801.

RAN 810 may be, or may include, a 5G RAN that includes one or more base stations (e.g., one or more gNBs 811), via which UE 801 may communicate with one or more other elements of environment 800. UE 801 may communicate with RAN 810 via an air interface (e.g., as provided by gNB 811). For instance, RAN 810 may receive traffic (e.g., voice call traffic, data traffic, messaging traffic, signaling traffic, etc.) from UE 801 via the air interface, and may communicate the traffic to UPF/PGW-U 835, and/or one or more other devices or networks. Similarly, RAN 810 may receive traffic intended for UE 801 (e.g., from UPF/PGW-U 835, AMF 815, and/or one or more other devices or networks) and may communicate the traffic to UE 801 via the air interface.

RAN 812 may be, or may include, a LTE RAN that includes one or more base stations (e.g., one or more eNBs 813), via which UE 801 may communicate with one or more other elements of environment 800. UE 801 may communicate with RAN 812 via an air interface (e.g., as provided by eNB 813). For instance, RAN 810 may receive traffic (e.g., voice call traffic, data traffic, messaging traffic, signaling traffic, etc.) from UE 801 via the air interface, and may communicate the traffic to UPF/PGW-U 835, and/or one or more other devices or networks. Similarly, RAN 810 may receive traffic intended for UE 801 (e.g., from UPF/PGW-U 835, SGW 817, and/or one or more other devices or networks) and may communicate the traffic to UE 801 via the air interface.

AMF 815 may include one or more devices, systems, Virtualized Network Functions ("VNFs"), Cloud-Native Network Functions ("CNFs"), etc., that perform operations to register UE 801 with the 5G network, to establish bearer channels associated with a session with UE 801, to hand off UE 801 from the 5G network to another network, to hand off UE 801 from the other network to the 5G network, manage mobility of UE 801 between RANs 810 and/or gNBs 811, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, CNFs, etc., that perform operations to register UE 801 with the EPC, to establish bearer channels associated with a session with UE 801, to hand off UE 801 from the EPC to another network, to hand off UE 801 from another network to the EPC, manage mobility of UE 801 between RANs 812 and/or eNBs 813, and/or to perform other operations.

SGW 817 may include one or more devices, systems, VNFs, CNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, CNFs, etc., that gather, process, store, and/or provide information in a manner described herein. SMF/PGW-C 820 may, for example, facilitate the establishment of communication sessions on behalf of UE 801. In some embodiments, the establishment of communications sessions may be performed in accordance with one or more policies provided by PCF/PCRF 825.

PCF/PCRF 825 may include one or more devices, systems, VNFs, CNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, CNFs, etc., that receive, store, and/or provide information that may be used in determining parameters (e.g., quality of service parameters, charging parameters, or the like) for certain applications.

UPF/PGW-U 835 may include one or more devices, systems, VNFs, CNFs, etc., that receive, store, and/or provide data (e.g., user plane data). For example, UPF/PGW-U 835 may receive user plane data (e.g., voice call traffic, data traffic, etc.), destined for UE 801, from DN 850, and may forward the user plane data toward UE 801 (e.g., via RAN 810, SMF/PGW-C 820, and/or one or more other devices). In some embodiments, multiple UPFs 835 may be deployed (e.g., in different geographical locations), and the delivery of content to UE 801 may be coordinated via the N9 interface (e.g., as denoted in FIG. 8 by the line marked "N9" originating and terminating at UPF/PGW-U 835). Similarly, UPF/PGW-U 835 may receive traffic from UE 801 (e.g., via RAN 810, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

HSS/UDM 840 and AUSF 845 may include one or more devices, systems, VNFs, CNFs, etc., that manage, update, and/or store, in one or more memory devices associated with AUSF 845 and/or HSS/UDM 840, profile information associated with a subscriber. AUSF 845 and/or HSS/UDM 840 may perform authentication, authorization, and/or accounting operations associated with the subscriber and/or a communication session with UE 801.

DN 850 may include one or more wired and/or wireless networks. For example, DN 850 may include an Internet Protocol ("IP")-based PDN, a wide area network ("WAN") such as the Internet, a private enterprise network, and/or one or more other networks. UE 801 may communicate, through DN 850, with data servers, other UEs 801, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 801 may communicate.

Figure 9:
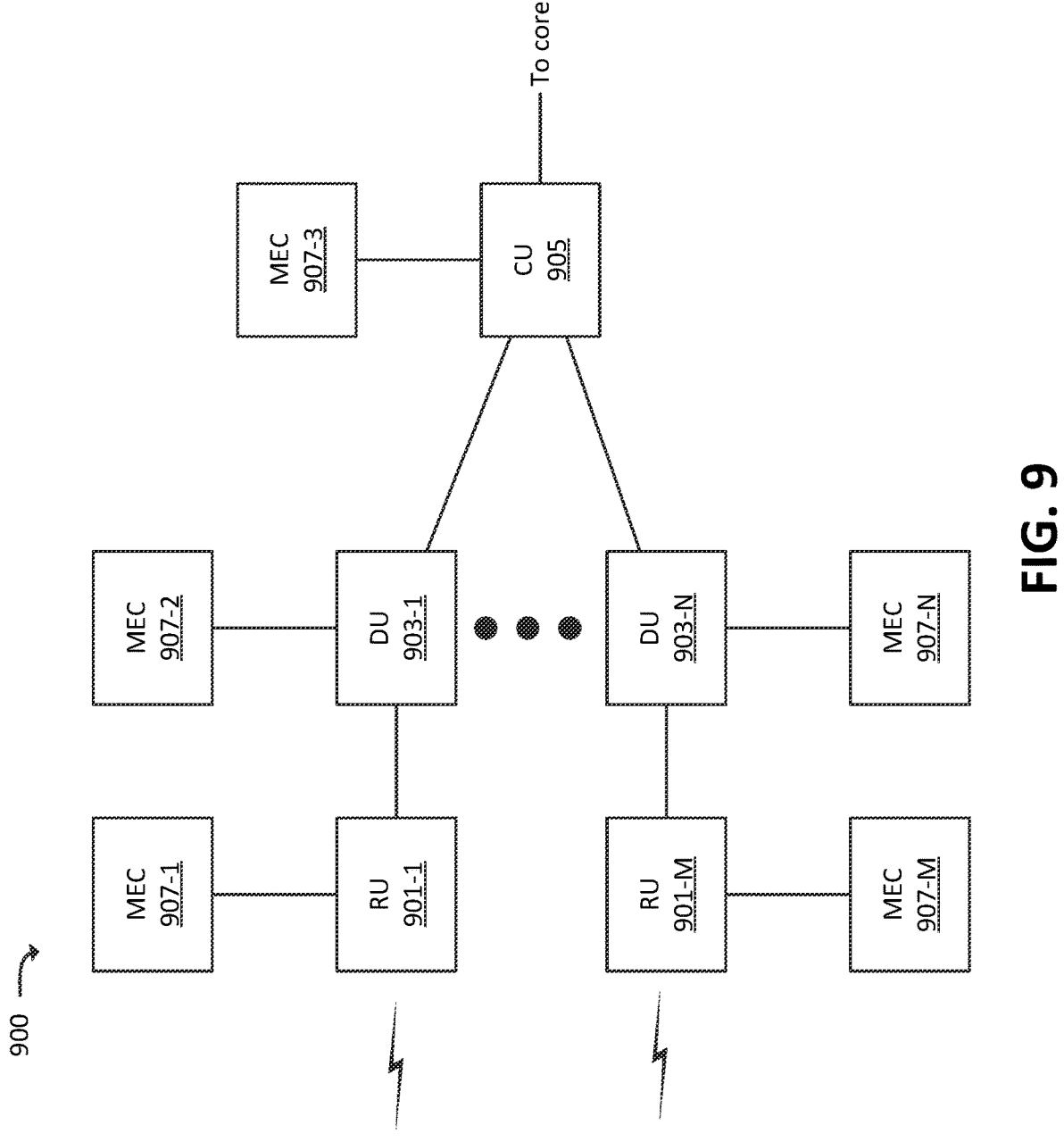
FIG. 9 illustrates an example arrangement of a radio access network ("RAN"), in accordance with some embodiments.

FIG. 9 illustrates an example Distributed Unit ("DU") network 900, which may be included in and/or implemented by one or more RANs (e.g., RAN 810, RAN 812, or some other RAN). In some embodiments, a particular RAN may include one DU network 900. In some embodiments, a particular RAN may include multiple DU networks 900. In some embodiments, DU network 900 may correspond to a particular gNB 811 of a 5G RAN (e.g., RAN 810). In some embodiments, DU network 900 may correspond to multiple gNBs 811. In some embodiments, DU network 900 may correspond to one or more other types of base stations of one or more other types of RANs. As shown, DU network 900 may include Central Unit ("CU") 905, one or more Distributed Units ("DUs") 903-1 through 903-N (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 815 and/or UPF/PGW-U 835). In the uplink direction (e.g., for traffic from UEs 801 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 801, and may determine which DU(s) 903 should receive the downlink traffic. DU 903 may include one or more devices that transmit traffic between a core network (e.g., via CU 905) and UE 801 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 801.

RU 901 may include hardware circuitry (e.g., one or more RF transceivers, antennas, radios, and/or other suitable hardware) to communicate wirelessly (e.g., via an RF interface) with one or more UEs 801, one or more other DUs 903 (e.g., via RUs 901 associated with DUs 903), and/or any other suitable type of device. In the uplink direction, RU 901 may receive traffic from UE 801 and/or another DU 903 via the RF interface and may provide the traffic to DU 903. In the downlink direction, RU 901 may receive traffic from DU 903, and may provide the traffic to UE 801 and/or another DU 903.

RUs 901 may, in some embodiments, be communicatively coupled to one or more Multi-Access/Mobile Edge Computing ("MEC") devices, referred to sometimes herein simply as "MECs" 907. For example, RU 901-1 may be communicatively coupled to MEC 907-1, RU 901-M may be communicatively coupled to MEC 907-M, DU 903-1 may be communicatively coupled to MEC 907-2, DU 903-N may be communicatively coupled to MEC 907-N, CU 905 may be communicatively coupled to MEC 907-3, and so on. MECs 907 may include hardware resources (e.g., configurable or provisionable hardware resources) that may be configured to provide services and/or otherwise process traffic to and/or from UE 801, via a respective RU 901.

For example, RU 901-1 may route some traffic, from UE 801, to MEC 907-1 instead of to a core network (e.g., via DU 903 and CU 905). MEC 907-1 may process the traffic, perform one or more computations based on the received traffic, and may provide traffic to UE 801 via RU 901-1. In this manner, ultra-low latency services may be provided to UE 801, as traffic does not need to traverse DU 903, CU 905, and an intervening backhaul network between DU network 900 and the core network. In some embodiments, MEC 907 may include, and/or may implement, some or all of the functionality described above with respect to FLS 101.

Figure 10:
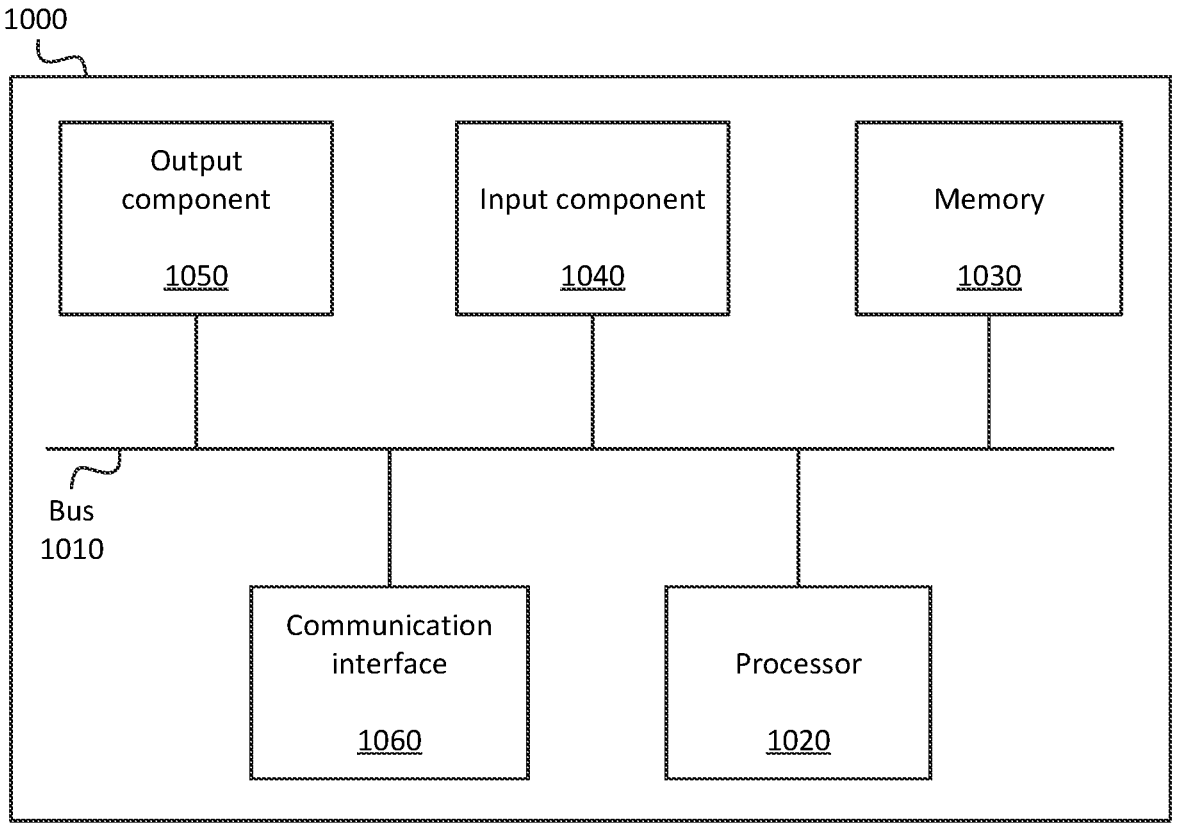
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. In some embodiments, processor 1020 may be or may include one or more hardware processors. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
  one or more processors configured to:
    receive policy information specifying respective sets of criteria for a plurality of different node groups, wherein the respective sets of criteria include a device type criteria;
    identify that a first set of nodes is associated with a first device type;
    identify, based on a first device type criteria specified by the policy information and further based on identifying that the first set of nodes is associated with the first device type, that the first set of nodes are associated with a first node group of the plurality of node groups;
    identify that a second set of nodes is associated with a second device type;
    identify, based on a second device type of criteria specified by the policy information and further based on identifying that the second set of nodes is associated with the second device type, that the second set of nodes are associated with a second node group of the plurality of node groups;
    receive, from the first set of nodes, a first set of refinement information for a particular machine learning model, wherein the first set of refinement information includes a first plurality of modifications to a particular feature of the particular machine learning model, wherein each modification to the particular feature, of the first set of refinement information, has been generated by a respective node of the first set of nodes based on sensor data detected by the respective node of the first set of nodes;
    receive, from the second set of nodes, a second set of refinement information for the particular machine learning model, wherein the second set of refinement information includes a second plurality of modifications to the particular feature of the particular machine learning model, wherein each modification to the particular feature, of the second set of refinement information, has been generated by a respective node of the second set based on sensor data detected by the respective node of the second set of nodes;
    generate first aggregated refinement information based on first set of refinement information for the particular machine learning model;
    generate second aggregated refinement information based on the second set of refinement information for the particular machine learning model;
    determine a first weight associated with the first node group, wherein the first weight is determined based on identifying that the first node group is associated with the first device type;
    determine a second weight associated with the second node group, wherein the second weight is determined based on identifying that the second node group is associated with the second device type;
    identify a measure of error associated with the second set of refinement information, wherein identifying the measure of error includes:
      applying the second set of refinement information to a set of data that includes a plurality of labels, and
      identifying the measure of error based on applying the second set of refinement information to a particular subset, of the set of data, that is associated with a particular label of the plurality of labels;
    identify that the measure of error associated with the second set of refinement information exceeds a threshold measure of error;
    determine a third weight associated with the second group based on identifying that the measure of error, associated with the second refinement information, exceeds the threshold measure of error; and
    modify the particular machine learning model based on the first and second aggregated refinement information and further based on the first and third weights.

2. The device of claim 1, wherein determining the first weight associated with the first node group includes:

determining a measure of variation between the refinement information associated with the first node group and the second node group.

3. The device of claim 2, wherein a first measure of variation between the first node group and the second node group is associated with the first weight for the first node group, and wherein a second measure of variation, that is lower than the first measure of variation, between the first node group and the second node group is associated with a third weight, that is higher than the first weight, for the first node group.

4. The device of claim 1, wherein modifying the particular machine learning model based on the aggregated refinement information and the first and second weights respectively associated with the first and second node groups consumes fewer processing resources than modifying the particular machine learning model based on the plurality of instances of refinement information.

5. The device of claim 1, wherein the refinement information includes feature importance gradients for one or more features associated with the particular machine learning model.

6. The device of claim 1, wherein the measure of error associated with the second set of refinement information is a second measure of error, wherein determining the first weight associated with the first node group includes:

determining a first measure of error with respect to a particular label associated with a particular instance of refinement information associated with the first node group, wherein the first weight associated with the first node group is further based on the determined first measure of error.

7. The device of claim 1, wherein the first set of nodes includes a plurality of Internet of Things ("IoT") devices that each include one or more respective sensors that detect the sensor data associated with each respective node of the first set of nodes.

8. A non-transitory computer-readable medium, storing a plurality of processor-executable instructions to:

receive policy information specifying respective sets of criteria for a plurality of different node groups, wherein the respective sets of criteria include a device type criteria;

identify that a first set of nodes is associated with a first device type;

identify, based on a first device type criteria specified by the policy information and further based on identifying that the first set of nodes is associated with the first device type, that the first set of nodes are associated with a first node group of the plurality of node groups;

identify that a second set of nodes is associated with a second device type;

identify, based on a second device type of criteria specified by the policy information and further based on identifying that the second set of nodes is associated with the second device type, that the second set of nodes are associated with a second node group of the plurality of node groups;

receive, from the first set of nodes, a first set of refinement information for a particular machine learning model, wherein the first set of refinement information includes a first plurality of modifications to a particular feature of the particular machine learning model, wherein each modification to the particular feature, of the first set of refinement information, has been generated by a respective node of the first set of nodes based on sensor data detected by the respective node of the first set of nodes;

receive, from the second set of nodes, a second set of refinement information for the particular machine learning model, wherein the second set of refinement information includes a second plurality of modifications to the particular feature of the particular machine learning model, wherein each modification to the particular feature, of the second set of refinement information, has been generated by a respective node of the second set based on sensor data detected by the respective node of the second set of nodes;

generate first aggregated refinement information based on first set of refinement information for the particular machine learning model;

generate second aggregated refinement information based on the second set of refinement information for the particular machine learning model;

determine a first weight associated with the first node group, wherein the first weight is determined based on identifying that the first node group is associated with the first device type;

determine a second weight associated with the second node group, wherein the second weight is determined based on identifying that the second node group is associated with the second device type;

identify a measure of error associated with the second set of refinement information, wherein identifying the measure of error includes:

applying the second set of refinement information to a set of data that includes a plurality of labels, and identifying the measure of error based on applying the second set of refinement information to a particular subset, of the set of data, that is associated with a particular label of the plurality of labels;

identify that the measure of error associated with the second set of refinement information exceeds a threshold measure of error;

determine a third weight associated with the second group based on identifying that the measure of error, associated with the second refinement information, exceeds the threshold measure of error; and modify the particular machine learning model based on the first and second aggregated refinement information and further based on the first and third weights.

9. The non-transitory computer-readable medium of claim 8, wherein determining the first weight associated with the first node group includes:

determining a measure of variation between the refinement information associated with the first node group and the second node group.

10. The non-transitory computer-readable medium of claim 9, wherein a first measure of variation between the first node group and the second node group is associated with the first weight for the first node group, and wherein a second measure of variation, that is lower than the first measure of variation, between the first node group and the second node group is associated with a third weight, that is higher than the first weight, for the first node group.

11. The non-transitory computer-readable medium of claim 8, wherein modifying the particular machine learning model based on the aggregated refinement information and the first and second weights respectively associated with the first and second node groups consumes fewer processing resources than modifying the particular machine learning model based on the plurality of instances of refinement information.

12. The non-transitory computer-readable medium of claim 8, wherein the refinement information includes feature importance gradients for one or more features associated with the particular machine learning model.

13. The non-transitory computer-readable medium of claim 8, wherein the measure of error associated with the second set of refinement information is a second measure of error, wherein determining the first weight associated with the first node group includes:

determining a first measure of error with respect to a particular label associated with a particular instance of refinement information associated with the first node group, wherein the first weight associated with the first node group is further based on the determined first measure of error.

14. The non-transitory computer-readable medium of claim 8, wherein the first set of nodes includes a plurality of Internet of Things ("IoT") devices that each include one or more respective sensors that detect the sensor data associated with each respective node of the first set of nodes.

15. A method, comprising:

receiving policy information specifying respective sets of criteria for a plurality of different node groups, wherein the respective sets of criteria include a device type criteria;

identifying that a first set of nodes is associated with a first device type;

identifying, based on a first device type criteria specified by the policy information and further based on identifying that the first set of nodes is associated with the first device type, that the first set of nodes are associated with a first node group of the plurality of node groups;

identifying that a second set of nodes is associated with a second device type;

identifying, based on a second device type of criteria specified by the policy information and further based on identifying that the second set of nodes is associated with the second device type, that the second set of nodes are associated with a second node group of the plurality of node groups;

receiving, from the first set of nodes, a first set of refinement information for a particular machine learning model, wherein the first set of refinement information includes a first plurality of modifications to a particular feature of the particular machine learning model, wherein each modification to the particular feature, of the first set of refinement information, has been generated by a respective node of the first set of nodes based on sensor data detected by the respective node of the first set of nodes;

receiving, from the second set of nodes, a second set of refinement information for the particular machine learning model, wherein the second set of refinement information includes a second plurality of modifications to the particular feature of the particular machine learning model, wherein each modification to the particular feature, of the second set of refinement information, has been generated by a respective node of the second set based on sensor data detected by the respective node of the second set of nodes;

generating first aggregated refinement information based on first set of refinement information for the particular machine learning model;

generating second aggregated refinement information based on the second set of refinement information for the particular machine learning model;

determining a first weight associated with the first node group, wherein the first weight is determined based on identifying that the first node group is associated with the first device type;

determining a second weight associated with the second node group, wherein the second weight is determined based on identifying that the second node group is associated with the second device type;

identifying a measure of error associated with the second set of refinement information, wherein identifying the measure of error includes:

applying the second set of refinement information to a set of data that includes a plurality of labels, and identifying the measure of error based on applying the second set of refinement information to a particular subset, of the set of data, that is associated with a particular label of the plurality of labels;

identifying that the measure of error associated with the second set of refinement information exceeds a threshold measure of error;

determining a third weight associated with the second group based on identifying that the measure of error, associated with the second refinement information, exceeds the threshold measure of error; and modifying the particular machine learning model based on the first and second aggregated refinement information and further based on the first and third weights.

16. The method of claim 15, wherein determining the first weight associated with the first node group includes:

determining a measure of variation between the refinement information associated with the first node group and the second node group, wherein a first measure of variation between the first node group and the second node group is associated with the first weight for the first node group, and wherein a second measure of variation, that is lower than the first measure of variation, between the first node group and the second node group is associated with a third weight, that is higher than the first weight, for the first node group.

17. The method of claim 15, wherein modifying the particular machine learning model based on the aggregated refinement information and the first and second weights respectively associated with the first and second node groups consumes fewer processing resources than modifying the particular machine learning model based on the plurality of instances of refinement information.

18. The method of claim 15, wherein the refinement information includes feature importance gradients for one or more features associated with the particular machine learning model.

19. The method of claim 15, wherein the measure of error associated with the second set of refinement information is a second measure of error, wherein determining the first weight associated with the first node group includes:

determining a first measure of error with respect to a particular label associated with a particular instance of refinement information associated with the first node group, wherein the first weight associated with the first node group is further based on the determined first measure of error.

20. The method of claim 15, wherein the first set of nodes includes a plurality of Internet of Things ("IoT") devices that each include one or more respective sensors that detect the sensor data associated with each respective node of the first set of nodes.

\* \* \* \* \*